(12) United States Patent
Ihara et al.

(10) Patent No.: US 8,417,479 B2
(45) Date of Patent: Apr. 9, 2013

(54) SYSTEM FOR CALCULATING AXIAL DEFORMATION OF TURBINE ROTOR

(75) Inventors: Keisuke Ihara, Hyogo (JP); Toshiyuki Sakae, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/679,023

(22) PCT Filed: Jun. 30, 2008

(86) PCT No.: PCT/JP2008/061865
§ 371 (c)(1),
(2), (4) Date: Mar. 19, 2010

(87) PCT Pub. No.: WO2010/001458
PCT Pub. Date: Jan. 7, 2010

(65) Prior Publication Data
US 2010/0241393 A1 Sep. 23, 2010

(51) Int. Cl.
 *G01C 9/00* (2006.01)
 *G01B 3/00* (2006.01)
 *G01B 5/00* (2006.01)
(52) U.S. Cl.
 USPC ............... 702/151; 702/34; 702/35; 702/105; 702/150; 702/157
(58) Field of Classification Search .................. 702/150, 702/34, 35, 105, 157, 151
 See application file for complete search history.

(56) References Cited

U.S. PATENT DOCUMENTS

| 4,318,179 A | * | 3/1982 | Kure-Jensen et al. | ......... 700/279 |
| 5,151,870 A | | 9/1992 | Beebe et al. | |
| 5,232,339 A | * | 8/1993 | Plemmons et al. | ........... 415/178 |
| 6,591,218 B1 | * | 7/2003 | Lysen | ........................ 702/151 |

FOREIGN PATENT DOCUMENTS

| JP | 53-29157 A | 3/1978 |
| JP | 6-508680 A | 9/1994 |
| JP | 07-037104 A | 2/1995 |
| JP | 07-332949 A | 12/1995 |
| JP | 10-239576 A | 9/1998 |
| JP | 11-230733 A | 8/1999 |
| JP | 2001-091244 A | 4/2001 |
| JP | 2005-031005 A | 2/2005 |

OTHER PUBLICATIONS

International Search Report of Application No. PCT/JP2008/061865 mailed Sep. 22, 2008.

* cited by examiner

*Primary Examiner* — Andrew Schechter
*Assistant Examiner* — L. Anderson
(74) *Attorney, Agent, or Firm* — Kanesaka Berner & Partners, LLP

(57) ABSTRACT

A system calculates axial deformation of a turbine rotor. The system includes an input part that sets measurement points of rotor disks that constitute the turbine rotor; a deflection amount detection part that derives radial displacement amounts of the turbine rotor for at least four or more measurement points along an outer surface in a circumferential direction of the turbine rotor based on measured values measured by a displacement gage; a storage part that stores the radial displacement amounts and measured angles at the measurement points; and a calculation part that calculates misalignment data of a most probable circle of the turbine rotor based on data stored. The calculated circle is calculated from the displacement amount and the measured angles. The most probable circle is determined from the calculated circle, and the misalignment data of the most probable circle is calculated from the most probable circle.

4 Claims, 10 Drawing Sheets

⊗ : MEASURED VALUE (MEASUREMENT POINT)
● : CALCULATED CIRCLE VALUE

FIG. 9
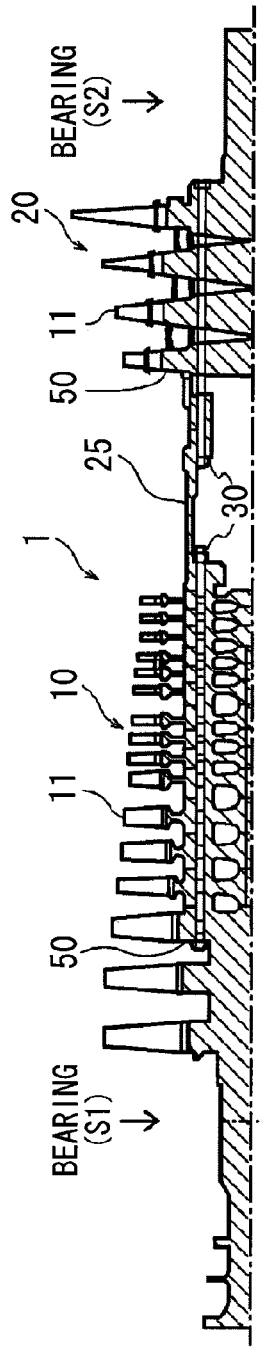
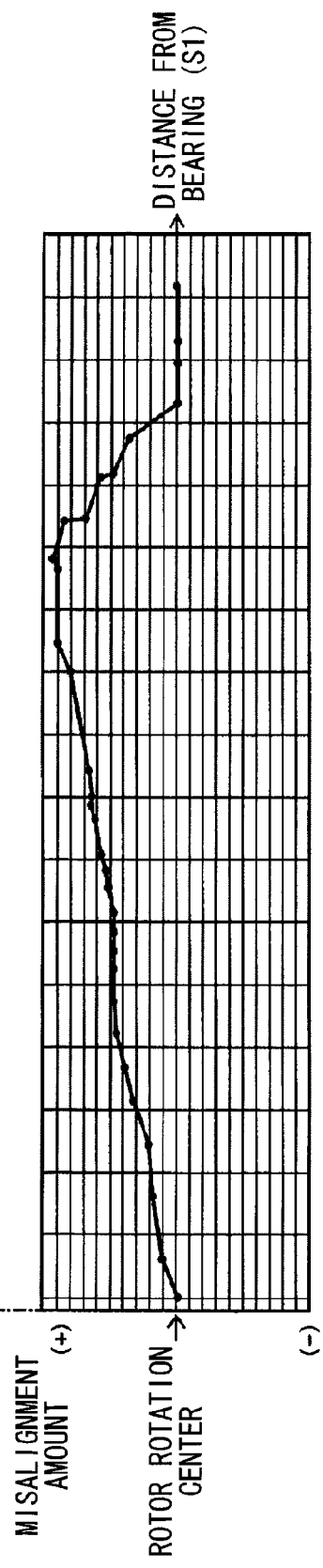

SYSTEM FOR CALCULATING AXIAL DEFORMATION OF TURBINE ROTOR

RELATED APPLICATIONS

The present application is a National Phase of International Application Number PCT/JP2008/061865, filed Jun. 30, 2008, the disclosure of which is hereby incorporated by reference herein in its entirety.

TECHNICAL FIELD

The present invention relates to a system for calculating axial deformation of a turbine rotor.

BACKGROUND ART

Generally, axial deformation or misalignment that occurs in a turbine rotor causes imbalance of the turbine rotor, which may cause shaft vibration during operation. Excessive shaft vibration causes an abnormality in a bearing part and prevents normal operation. A further progress of the excessive vibration may lead to a break of the shaft. Thus, to prevent such a break, it is important to keep axial deformation or alignment of the turbine rotor within an acceptable value.

Turbine rotors covered by the present invention include a gas turbine rotor and also a steam turbine rotor.

DISCLOSURE OF INVENTION

Generally, for calculating axial deformation of a turbine rotor, a method is known using a least squares method disclosed in Japanese Unexamined Patent Application, Publication No. 2001-91244 (hereinafter referred to as JP '244) or the like to calculate circularity of the rotor or a misalignment amount of a rotor axial center and calculate the axial deformation.

However, the conventional method disclosed in JP '244 is a calculation method with high accuracy, but has a problem that calculation is complicated and an enormous amount of calculation is required.

The present invention is achieved to solve such a problem, and has an object to provide a system for calculating axial deformation of a turbine rotor by a simpler method than conventional methods.

The present invention provides a system for calculating axial deformation of a turbine rotor, including: an input part that sets measurement points of a rotor disk that constitutes the turbine rotor; a deflection amount detection part that derives radial displacement amounts of the turbine rotor for at least four or more measurement points along an outer surface in a circumferential direction of the turbine rotor based on measured values measured by a displacement gage; a storage part that stores the radial displacement amounts derived by the deflection amount detection part and measured angles at the measurement points; and a calculation part that calls up data stored in the storage part and calculates misalignment data of a most probable circle of the turbine rotor, wherein the calculation part includes a misalignment calculation part that selects three arbitrary points among all the measurement points stored in the storage part to calculate a calculated circle from the radial displacement amounts and the measured angles, calculates calculated circle values for all the measurement points from the calculated circle, calculates differences between the calculated circle values and the radial displacement amounts as error amounts at the measurement points, sums the error amounts to derive a total error amount value, repeats calculation for combinations of three measurement points among all the measurement points to calculate each total error amount value, selects a minimum calculated circle among obtained total error amount values for all combinations as a most probable circle, and calculates deviation between the center of the most probable circle and the center of rotation of the turbine rotor as the misalignment data of the most probable circle, a misalignment determination part that calculates a maximum misalignment amount with reference to the misalignment data of the most probable circle for all the rotor disks to determine whether the maximum misalignment amount is within a reference value or not, and a calculation part for the distribution of axial deformation that calculates the distribution of axial deformation from the misalignment data of the most probable circle.

According to the present invention, at least four or more measurement points are set in the circumferential direction of the turbine rotor, the calculated circle is calculated from the displacement amount and the measured angle measured at each measurement point, the most probable circle is determined from the calculated circle, and the misalignment data of the most probable circle is calculated from the most probable circle, thereby allowing axial deformation to be calculated by a simpler method than conventional methods.

In the present invention, the calculation part may include a corrected disk selection part that selects a rotor disk to be corrected, and a correction amount determination part that determines a correction amount of the rotor disk to be corrected.

With this configuration, when the maximum misalignment amount exceeds the reference value, the corrected disk selection part selects the rotor disk to be corrected, and the correction amount determination part determines the correction amount of the rotor disk, thereby allowing the axial deformation of the turbine rotor to be easily corrected.

In the present invention, the corrected disk selection part may select a rotor disk having the maximum misalignment amount as a rotor disk to be corrected.

With this configuration, the rotor disk having the maximum misalignment amount is to be corrected, thereby minimizing the maximum misalignment amount after the correction of the rotor disk.

In the present invention, the correction amount determination part may select the maximum misalignment amount of the rotor disk to be corrected as a disk correction amount.

With this configuration, the disk correction amount is determined based on the maximum misalignment amount, thereby providing the simplest correction method and minimizing the axial deformation of the turbine rotor after the correction of the rotor disk.

According to the present invention, the most probable circle can be easily selected, and thus axial deformation of the rotor can be calculated accurately by a simple method without an enormous amount of calculation as disclosed in JP '244.

BRIEF DESCRIPTION OF DRAWINGS

FIG. 9 shows an example of the distribution of axial deformation of the gas turbine rotor.

EXPLANATION OF REFERENCE

Figure 1:
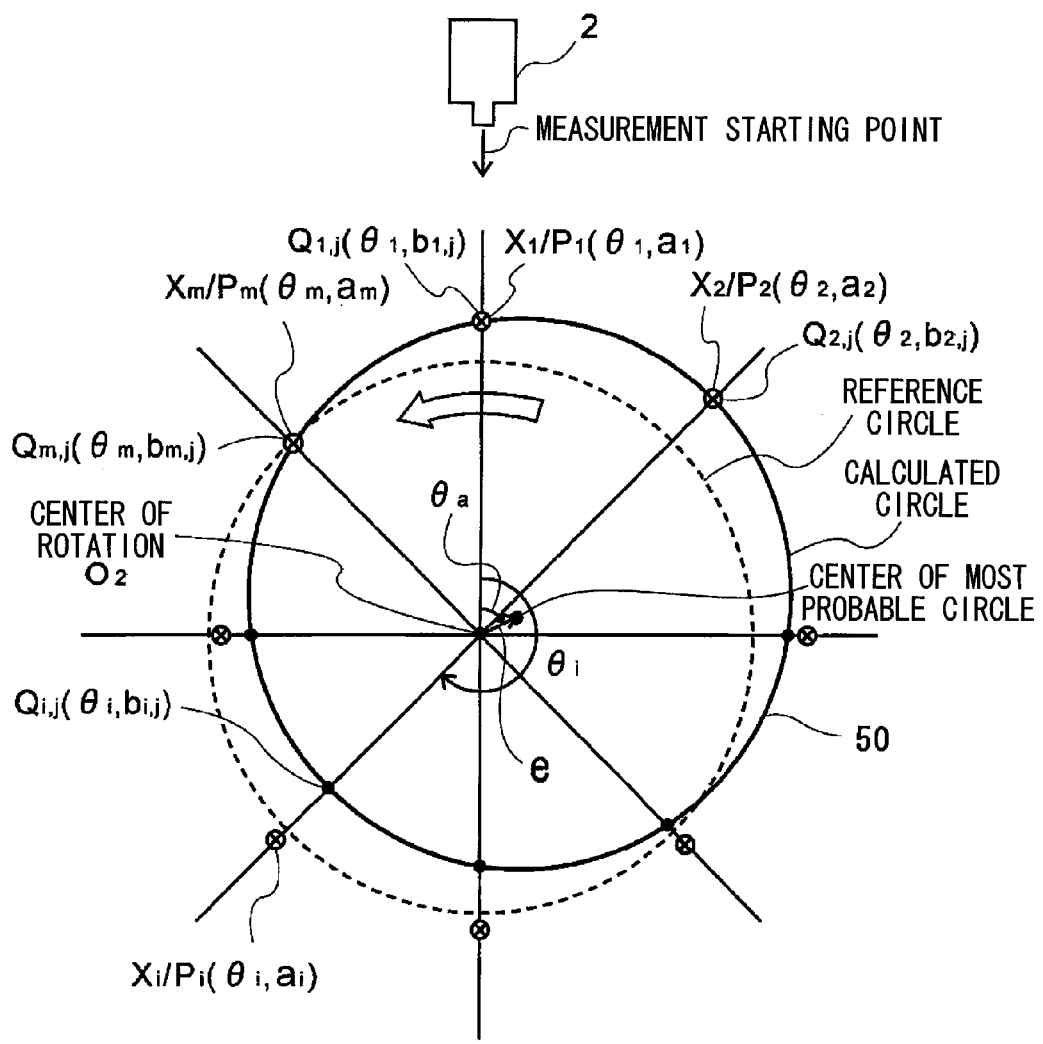
FIG. 1 is a diagram showing a relationship among a measured value, a reference circle, and a calculated circle according to the present invention.

1: gas turbine rotor
10: compressor rotor part
11: blades
20: turbine rotor part
25: intermediate shaft
30: spindle bolt
50: rotor disk
50$b$, 50$c$: joint surface
51: adjacent rotor disk
51$b$, 51$c$: joint surface
S1, S2: bearing
RC: rotor rotation center line
CC1, CC2: rotor axial center
L1, L2: length with reference to outer surface of rotor disk corresponding to cutting amount
LL1, LL2: distance between bearing and rotor disk joint surface
DD: diameter of rotor disk
DM: the number of rotor disks
M: rank number of rotor disk
X: measurement point
P: measured value
Q: calculated circle value
$\theta$: measured angle
$\alpha$: contact surface angle of rotor disk
$\alpha1$, $\alpha2$: inclination angle of rotor axial center
$\beta$: rotation angle
a: measured value
b: calculated circle value
$\Delta$: error amount
$\Delta S$: total error amount value
e: eccentric distance between the center of figure and the center of rotation of turbine rotor
m: the number of measurement points in circumferential direction of rotor disk
n: the number of combinations of three measurement points

BEST MODE FOR CARRYING OUT THE INVENTION

An embodiment of the present invention will be described with reference to the drawings, which merely show the embodiment by way of example, and the present invention is not limited to the embodiment. Components in the embodiment include components easily replaceable by those skilled in the art, or substantial equivalents. A gas turbine rotor will be described below by way of example.

Figure 8:
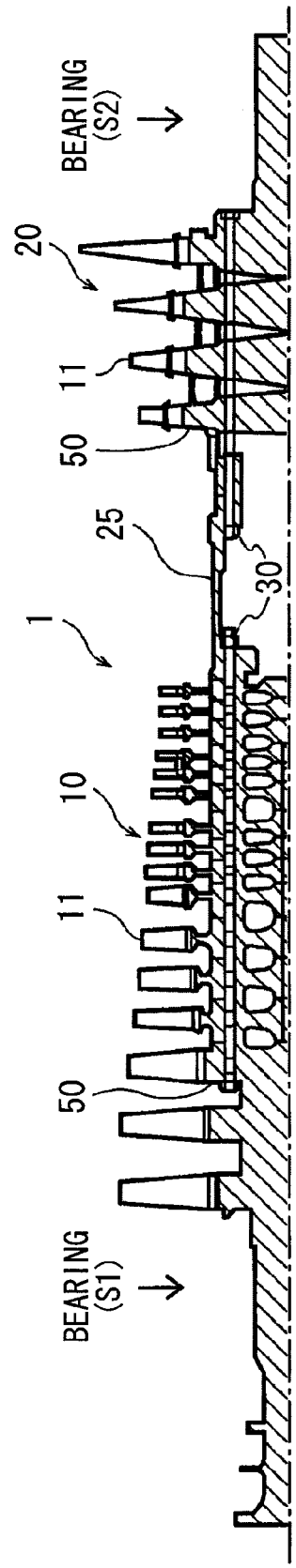
FIG. 8 is a diagram showing a structure of the gas turbine rotor.

FIG. 8 shows a general structure of a gas turbine rotor. The gas turbine rotor 1 includes a compressor rotor part 10, a turbine rotor part 20, and an intermediate shaft 25 connecting the rotor parts, and the compressor rotor part 10 and the turbine rotor part 20 are each constituted by disk-shaped rotor disks 50 including blades 11 radially implanted in an outer periphery. The gas turbine rotor 1 is an assembly having an integral structure in which the rotor disks 50 are placed one next to another in a rotor axis direction and fastened by spindle bolts 30, and opposite ends thereof are supported by bearings S1 and S2.

Axial deformation or misalignment that occurs in the gas turbine rotor 1 having such a configuration causes shaft vibration. Also, a gap between a front end of each of the blades 11 mounted to the outer periphery of the rotor disk 50 and an outer casing (not shown) is adjusted to be constant in a circumferential direction. An increase in shaft vibration causes interference between the front end of the blades and the casing, which may disable operation. Thus, an axial deformation amount or a misalignment amount needs to be adjusted at the time of assembling the rotor to be kept within an acceptable value. Also, when the axial deformation exceeds the acceptable value, the axial deformation needs to be corrected.

The axial deformation is corrected by the following procedure. In the configuration of the gas turbine rotor 1 shown in FIG. 8, misalignment data including a misalignment amount and a misalignment angle is calculated for each rotor disk 50 to determine the distribution of axial deformation of the gas turbine rotor 1. An example of the distribution of axial deformation of the gas turbine rotor 1 is shown in FIG. 9. The abscissa represents a distance along the gas turbine rotor 1 from the bearing S1, and the ordinate represents a misalignment amount of the rotor disk 50.

One factor of occurrence of the axial deformation is a nonuniform thickness of the rotor disk 50. Thus, the misalignment amount of the rotor disk 50 sometimes exceeds the acceptable value depending on the way of placing the rotor disks 50 one next to another. In this case, a rotor disk 50 to be corrected is selected from the distribution of axial deformation of the gas turbine rotor 1, joint surfaces between the rotor disks 50 (in FIG. 7, contact surfaces 50$b$ and 51$b$ between rotor disks 50 and 51) are cut to correct the axial deformation so as to reduce a contact surface angle ($\alpha$) between the rotor disks 50 and 51 (FIG. 7).

Figure 7:
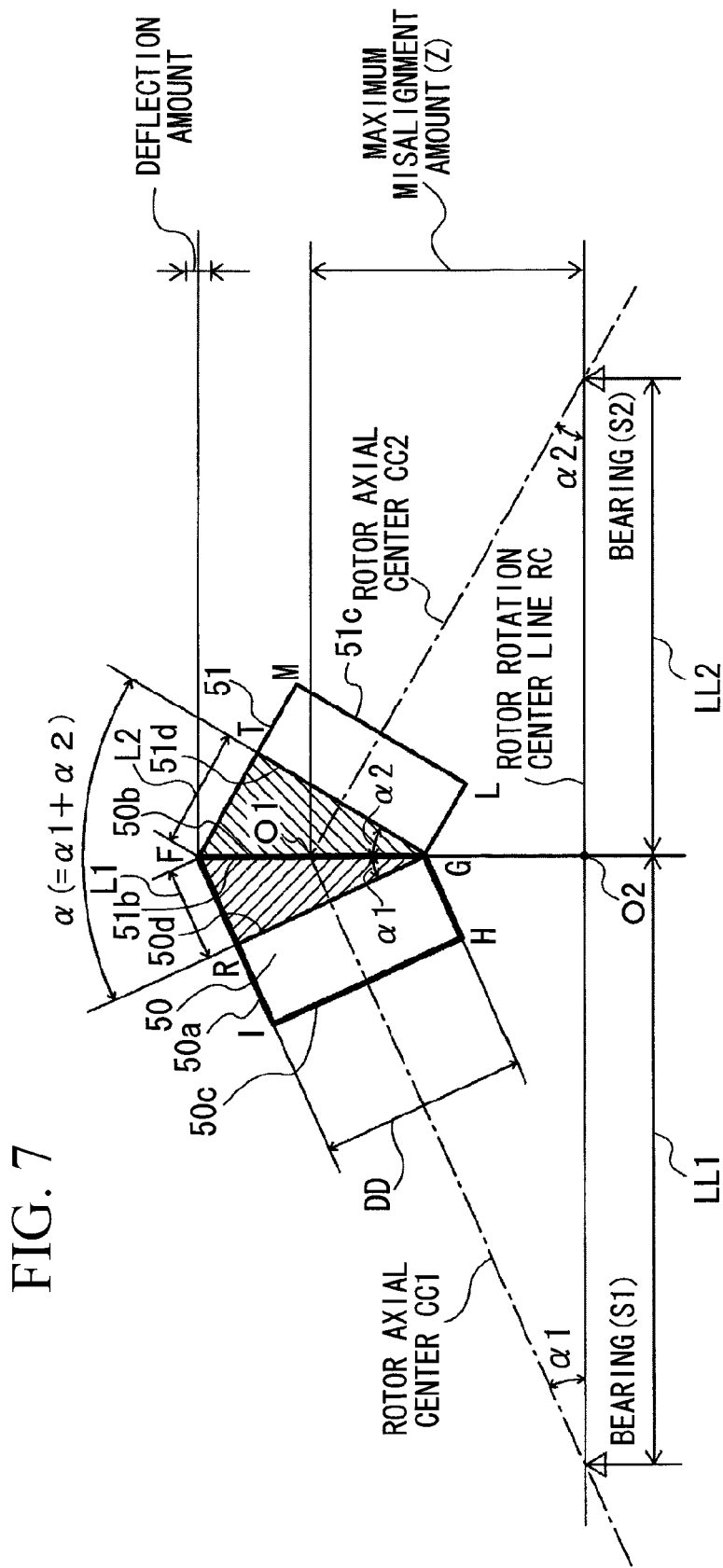
FIG. 7 is a diagram showing a state where the axial deformation of the gas turbine rotor occurs.

FIG. 7 shows a state where the axial deformation of the gas turbine rotor 1 occurs, and shows the rotor disks 50 and 51, a rotor disk joint surface FG, a contact surface angle ($\alpha$) between the rotor disks 50 and 51, and a relationship between a radial deflection amount and a misalignment amount of the rotor disks 50 and 51 with respect to a rotor rotation center line RC. The gas turbine rotor 1 includes the plurality of rotor disks 50 placed one next to another and integrated in the rotor axis direction, but only a part of the rotor disks is shown in FIG. 7.

The radial deflection amount of the rotor disk 50 is obtained by selecting a plurality of measurement points at circumferentially regular intervals on an outer surface 50$a$ of the rotor disk 50 while rotating the rotor, and measuring a radial displacement amount at each measurement point from a reading of a displacement gage at the measurement point. Specifically, with reference to a measurement starting point (a displacement amount at the measurement starting point is 0 (zero) for convenience), a radial displacement amount at each measurement point from the measurement starting point is regarded as a deflection amount at each measurement point.

As a displacement gage, various known sensors are used. For example, a contact sensor such as a dial gage, or a noncontact sensor such as a laser sensor, a capacitance sensor, or an ultrasonic sensor can be used.

Misalignment data is calculated from a measured value of the deflection amount at each measurement point. As shown in FIG. 7, the radial deflection amount of the gas turbine rotor 1 is indicated by a fluctuation range of a distance between the outer surface 50a of the rotor disk 50 and the rotor rotation center line RC. The rotor rotation center line RC refers to a line connecting the centers of the bearing S1 and the bearing S2. From the measured value of the deflection amount on the outer surface 50a of the rotor disk 50, the center of FIG. $O_1$ of a section of the rotor disk 50 to be measured is calculated, and deviation between the calculated center of FIG. $O_1$ and the rotor rotation center line RC is regarded as misalignment. The misalignment thus obtained is quantitatively indicated as misalignment data including a misalignment amount and a misalignment angle. The misalignment amount of each rotor disk is plotted according to the distance from the bearing S1 to obtain the distribution of axial deformation as shown in FIG. 9.

JP '244 discloses a method and an apparatus for calculating misalignment of a rotational body. Japanese Unexamined Patent Application, Publication No. Hei 11-230733 (hereinafter referred to as JP '733) discloses an example of a deflection amount measurement device of a turbine rotor.

Calculation of a misalignment amount of a rotor disk 50 forms the basis for calculation of the distribution of axial deformation of a gas turbine rotor 1. A basic idea of a calculation method of the misalignment amount will be described below.

FIG. 1 shows a section of the rotor disk 50 of the gas turbine rotor 1, and shows a relationship among a measured value, a reference circle, and a calculated circle on the section. An outer surface of the rotor disk 50 is divided in a circumferential direction of the rotor disk 50 into a plurality of (m) parts at regular intervals to define each measurement point $X_i$ (i=1 to m), and while the rotor disk 50 is rotated one turn in the direction of open arrow, a radial displacement amount $a_i$ on an outer surface of the gas turbine rotor is derived based on a measured value (a distance between a placement position of a displacement gage 2 and the outer surface of the rotor disk measurement and a rotation angle from a measurement starting point) measured by the displacement gage 2 at each measurement point $X_i$ (i=1 to m). Specifically, a distance between the displacement gage 2 and the outer surface of the rotor disk 50 at the measurement starting point $X_i$ is regarded as 0 (zero) for convenience, the distance at each measurement point $X_i$ (i=2 to m) is compared with the distance at the measurement starting point $X_i$, and a difference between the distances is regarded as a displacement amount ai. The measurement points $X_i$ (i=1 to m) may or may not be selected at regular intervals.

A reference circle is not an element directly related to a configuration of the present invention, but is shown for convenience as a circle having the center of figure that matches the center of rotation $O_2$ of the rotor disk 50. For the gas turbine rotor, the reference circle is a perfect circle, and the center of the reference circle is the center of rotation $O_2$ of the rotor.

The calculated circle is determined from a measured value $P_i$ (measured angle $\theta_i$ and radial displacement amount $a_i$) of a deflection amount at each measurement point $X_i$ (i=1 to m). A position and a measured angle of each measurement point $X_i$ (i=1 to m) are determined for the number of measurement points (m) in a circumferential direction, and measured values $P_i$ (measured angle $\theta_i$ and radial displacement amount $a_i$) of three arbitrary points are selected from measured values $P_i$ at the measurement points $X_i$ (i=1 to m), and thus these three points can always determine one circle. The circle determined by the three points is regarded as the calculated circle. The calculated circle is determined by a combination of three arbitrary measurement points among all the measurement points (m), and there are a total of ($_mC_3$) combinations. ($_mC_3$) means a total number of combinations of all three points when three arbitrary points are selected from (m) measurement points $X_i$ (i=1 to m). Thus, when n=($_mC_3$), there are (n) calculated circles.

In the present invention, three arbitrary points are selected from all the measurement points $X_i$ (i=1 to m), and one calculated circle is calculated from the three points. FIG. 1 shows a calculated circle calculated from three measurement points $X_1$, $X_2$ and $X_m$ by way of example.

Next, for each of the measurement points $X_i$ (i=1 to m), a radial deviation between each measured value $P_i$ (measured angle $\theta_i$ and radial displacement amount $a_i$) and the calculated circle, that is, a difference between each measured value $P_i$ and a calculated circle value (which refers to a value on the calculated circle, and the meaning of which will be described later) is calculated as an error amount $\Delta_{i,j}$. Specifically, a calculated circle value $Q_{i,j}$ at each measurement point $X_i$ (i=1 to m) is calculated from the calculated circle, and the error amount $\Delta_{i,j}$ is calculated from the measured value $P_i$ and the calculated circle value $Q_{i,j}$. Further, a total error amount value $\Delta S_j$ for one calculated circle is calculated from each error amount $\Delta_{i,j}$. Then, other calculated circles are successively calculated from the other combinations of three points among all the measurement points, and a total error amount value $\Delta S_j$ is similarly calculated for each calculated circle.

After the total error amount values $\Delta S_j$ (j=1 to n) are calculated for all the calculated circles, a minimum one of the total error amount values $\Delta S_j$ (j=1 to n) is selected as a minimum total error amount value $\Delta S_j$ (j=a), and a calculated circle corresponding to the minimum total error amount value $\Delta S_a$ (j=a) is determined as a most probable circle. The most probable circle is regarded as a figure closest to a sectional shape of the gas turbine rotor among all the calculated circles, and the center of the most probable circle is regarded as the center of figure. Deviation between the center of the most probable circle and the center of rotation is misalignment. Misalignment data including a misalignment amount (eccentric distance e) and a misalignment angle $\theta_a$ quantitatively indicates a state of the misalignment. Calculation of the misalignment amount (eccentric distance e) and the misalignment angle $\theta_a$ allows the level of the misalignment of the rotor disk 50 to be easily determined, and allows validity of the data to be easily determined.

For each calculated circle, one error amount $\Delta_{i,j}$ is calculated at each measurement point $X_i$ (i=1 to m), and one total error amount value $\Delta S_j$ can be calculated for each calculated circle. One most probable circle is determined for all the measurement points $X_i$ (i=1 to m).

The above-described method will be more specifically described with reference to FIG. 1. In FIG. 1, each measured value at each measurement point $X_i$ (i=1 to m) is denoted by $P_i$ ($\theta_i$, $a_i$). Reference character i is selected from any one of 1 to m, and the measurement point $X_i$ means an i-th measurement point from the measurement starting point ($X_1$). Reference character $\theta_i$ denotes a clockwise measured angle at the measurement point $X_i$ (i=1 to m) from the measurement starting point $X_i$, and reference character $a_i$ denotes a radial displacement amount at the measurement point $X_i$ (i=1 to m).

From a combination of three arbitrary measurement points, one calculated circle can be determined by a method described later (Equation 4). From the other combinations of three arbitrary points among all the measurement points, other calculated circles are calculated by the same method, and a total of (n) calculated circles can be determined Next, the meaning of the calculated circle value $Q_{i,j}$ will be described with reference to FIG. 1. The calculated circle value $Q_{i,j}$ is a value on one calculated circle selected from a combination of three arbitrary measurement points among all the measurement points $X_i$ (i=1 to m). The calculated circle value $Q_{i,j}$ is a value on a calculated circle, calculated from the calculated circle and having the same measured angle $\theta_i$ as a point corresponding to the measurement point $X_i$ (i-th measurement point from the measurement starting point), that is, the measurement point $X_i$. The calculated circle value $Q_{i,j}$ is denoted by reference character $Q_{i,j}$ ($\theta_i$, $b_{i,j}$). Similarly to the above, reference character $\theta_i$ denotes a clockwise measured angle from the measurement starting point at the measurement point $X_i$, and reference character $b_{i,j}$ denotes a calculated value on a calculated circle with a measured angle of $\theta_i$. When the calculated circle is determined, the calculated circle value $Q_i$, ($\theta_i$, $b_{i,j}$) can be calculated from the calculated circle and the measured angle $\theta_i$. For (m) measurement points, there are (n) calculated circles, and for reference characters i and j indicated below, the reference character i denotes any one of 1 to m and the reference character j denotes a point selected from any one of 1 to n. Specifically, the reference character i denotes a rank number of the measurement point from the measurement starting point $X_i$ for the (m) measurement points, and the reference character j denotes a rank number of a target calculated circle for (n) calculated circles.

When a difference from each calculated circle value $Q_{i,j}$ ($\theta_i$, $b_{i,j}$) corresponding to each measured value $P_i$ ($\theta_i$, $a_i$) is an error amount $\Delta_{i,j}$ at each measurement point $X_i$ (i=1 to m), the error amount $\Delta_{i,j}$ is expressed by the following equation.

$$\Delta_{i,j} = [P_i(\theta_i, a_i) - Q_{i,j}(\theta_i, b_{i,j})]^2 \quad \text{(Equation 1)}$$

In Equation 1, a difference between the measured value $P_i$ and the calculated circle value $Q_{i,j}$ is squared so that an influence of plus and minus signs of the value of the difference is eliminated, and in view of a case where the measured value includes an abnormal value, a difference between the abnormal value and a normal value is further enlarged to achieve easy selection of the abnormal value.

Then, for a target calculated circle, an error amount $\Delta_{i,j}$ is calculated for all the measurement points $X_i$ (i=1 to m) by Equation 1.

Further, the sum of the error amounts $\Delta_{i,j}$ is a total error amount value $\Delta S_j$, which is expressed by Equation 2.

$$\Delta S_j = \Sigma(\Delta_{i,j}) \quad \text{(Equation 2)}$$

For a target calculated circle, the error amounts $\Delta_{i,j}$ at each measurement point in Equation 1 are summed from the measurement point $X_1$ to the measurement point $X_m$ to obtain the total error amount value $\Delta S_j$.

Then, other different calculated circles are determined from combinations of other three arbitrary points among the measurement points $X_i$ (i=1 to m) in the same manner. Further, using Equations 1 and 2, an error amount $\Delta_{i,j}$ and a total error amount value $\Delta S_j$ are calculated for each calculated circle. Since one total error amount value $\Delta S_j$ can be calculated for each calculated circle, (n) total error amount values $\Delta S_j$ (j=1 to n) can be calculated for (n) calculated circles.

After the total error amount values $\Delta S_j$ (j=1 to n) for the (n) calculated circles are calculated, a minimum total error amount value $\Delta S_j$ (j=a) is selected among the total error amount values $\Delta S_j$ (j=1 to n), and a calculated circle having the minimum total error amount value $\Delta_a$ (j=a) is determined as a most probable circle. The most probable circle is regarded as a figure (perfect circle) closest to a sectional shape of the rotor among all the calculated circles, and the center of the most probable circle is regarded as the center of figure. Deviation between the center of the most probable circle and the center of rotation $O_2$ of the rotor disk 50 is misalignment. In FIG. 1, a deviation length (eccentric distance e) between the center of rotation $O_2$ of the rotor disk 50 and the center of the most probable circle is a misalignment amount. An angle $\theta_a$ indicating a clockwise misalignment direction from the measurement starting point $X_i$ is a misalignment angle. The center of rotation $O_2$ means the same as the center of rotation $O_2$ of the rotor shown in FIG. 8 as described above.

If the misalignment is determined in such a way, data can be obtained by a simpler method than a least squares method that is a conventional art disclosed in JP '244 or the like.

If the measured value includes an abnormal value, the abnormal value is reliably eliminated in the calculation process of the most probable circle. Specifically, the calculated circle is a circle determined by measured values of three arbitrary points, and there is always a calculated circle that does not include an abnormal value. Thus, from the calculated circles that do not include an abnormal value, a circle with a minimum total error amount value is naturally selected as the most probable circle. Since the abnormal value can be specified, the abnormal value can be eliminated and replaced with a measured value (remeasured value) after remeasurement. On the other hand, in the least squares method and the like that are the conventional arts disclosed in JP '244 and JP '733, calculation of misalignment involves an abnormal value, and there is always an influence of the abnormal value. Also, the abnormal value cannot be specified, and thus it is difficult to eliminate the abnormal value and replace the abnormal value with a remeasured value.

Next, the outline of a method of calculating a calculated circle from a measured value to determine an error amount will be described for the meaning on a plane coordinate.

Figure 3:
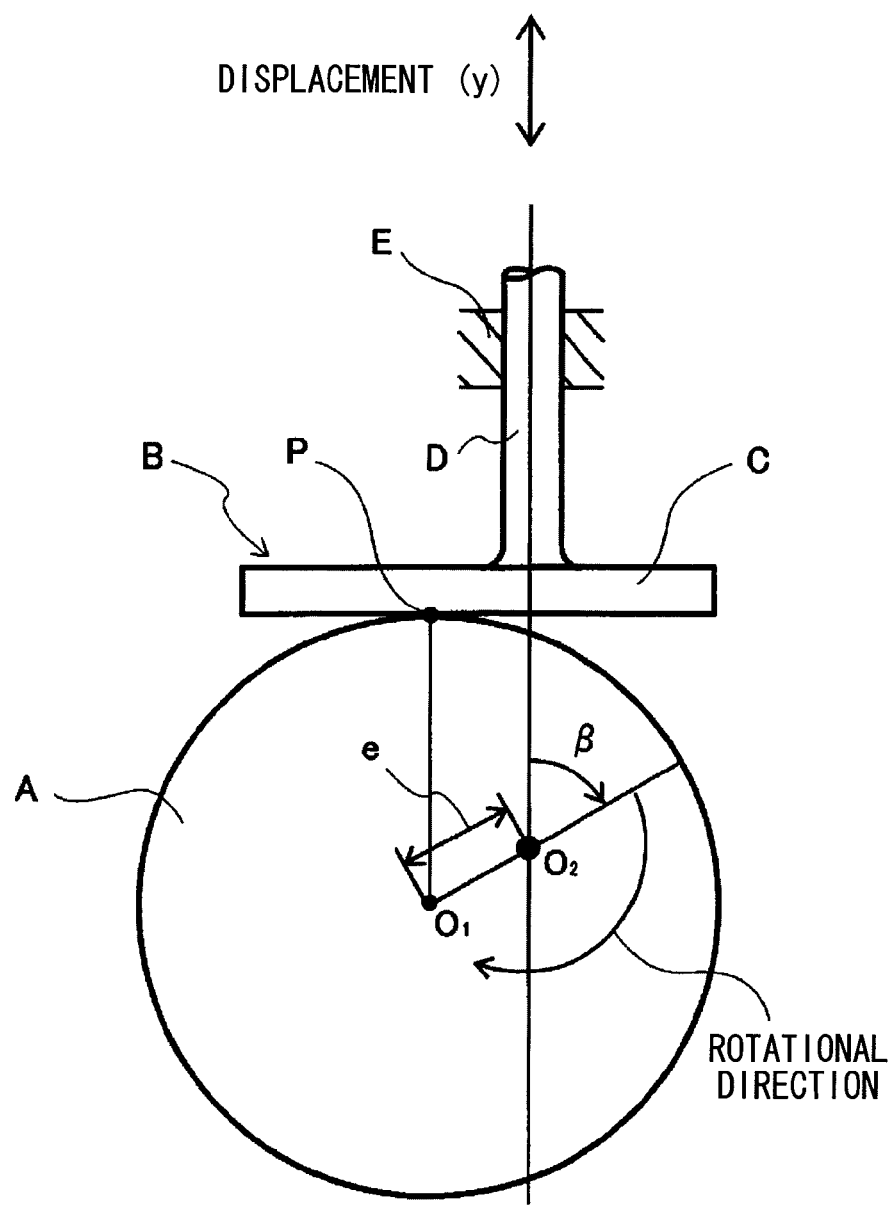
FIG. 3 is a conceptual view of an eccentric disk cam.

Changes in deflection when the rotor having misalignment is rotated can be approximated to deflection of an eccentric disk cam. FIG. 3 is a conceptual view of an eccentric disk cam. In FIG. 3, the eccentric disk cam includes a rotary disk A and a follower B, and the follower B includes a flat plate C and a shaft part D secured thereto. The follower B is in contact with a peripheral surface of the rotary disk A at a contact point P via the flat plate C. The follower B has a structure in which the shaft part D can be moved only in an axial direction (vertical direction on the sheet surface in FIG. 3) in a restraining member E, and the entire follower B can be moved in the vertical direction with rotation of the rotary disk A.

Further, the rotary disk A rotates around a point $O_2$ eccentric from the center of FIG. $O_1$ by a distance e, and the center of rotation $O_2$ is located on an axis of the shaft part D of the follower B. In such an eccentric disk cam, when the rotary disk A rotates around the eccentric point $O_2$, the follower B moves in the vertical direction with respect to the sheet surface with changes in rotation angle $\beta$.

Figure 4:
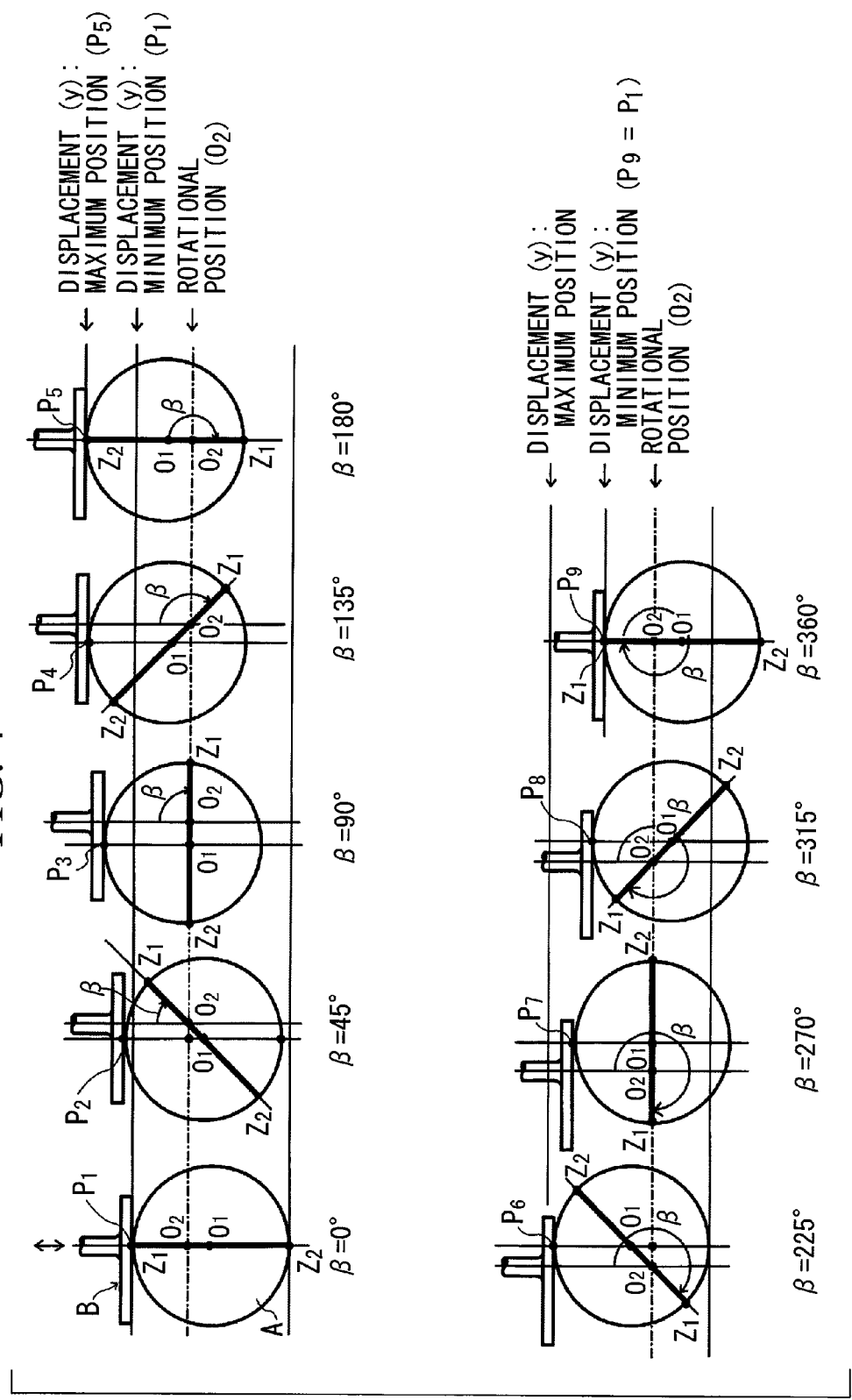
FIG. 4 is a diagram showing a relationship between a rotation angle and displacement of a contact point of the eccentric disk cam.

FIG. 4 shows changes of the contact point P with movement of the rotary disk A. FIG. 4 shows a state where when the rotary disk A rotates around the center of rotation $O_2$ and the rotation angle $\beta$ changes clockwise from 0° to 360° in 45° increments, the contact point P changes in the vertical direction from a contact point $P_1$ to a contact point $P_9$ with respect to the rotation angle $\beta$.

In FIG. 4, a state with a rotation angle β of 0° means a state where the center of disk $O_1$, the center of rotation $O_2$, and an axis of the shaft part D of the follower B matches in the vertical direction (on the sheet surface), and the center of rotation $O_2$ is located between the contact point P ($P_1$) and the center of disk $O_1$. In this state, chord $Z_1Z_2$ that forms a diameter of the rotary disk A is located on a vertical line on which the center of disk $O_1$, the center of rotation $O_2$, and the axis of the axis of the shaft part D match in the vertical direction with respect to the sheet surface. The rotation angle β that changes with rotation of the rotary disk A is indicated by a clockwise angle formed by the chord $Z_1Z_2$ and the vertical line (vertical line with respect to the sheet surface connecting the center of rotation $O_2$ and the axis of the shaft part D).

In FIG. 4, for a relative positional relationship in the vertical direction of the contact point P with respect to the center of rotation $O_2$, the position of the contact point P vertically moves with changes in the rotation angle β. The locus of the contact point P draws a sine curve (which may be referred to as a cosine curve) as described later. At a position of the rotation angle β of 0°, the height of the contact point P ($P_1$) is a minimum value (a vertical distance between the flat plate C and the center of rotation $O_2$ is minimum), and at a position of the rotation angle β of 180°, the height of the contact point P ($P_5$) is a maximum value (the vertical distance between the flat plate C and the center of rotation $O_2$ is maximum).

A difference between the maximum value ($P_5$) and the minimum value ($P_1$) of displacement of the contact point P is a maximum deflection width. The deflection width is twice the misalignment amount of the rotary disk A, that is, the eccentric distance e between the center of FIG. $O_1$ and the center of rotation $O_2$ of the rotary disk A. The rotation angle β in FIG. 4 is synonymous with the measured angle θ in FIG. 1, and the rotation angle β0 will be replaced with the measured angle θ in the description below.

When the displacement of the follower B of the eccentric disk cam, that is, the vertical displacement of the contact point P is y, the displacement y is expressed by Equation 3.

$$y = e(1 - \cos\theta) \qquad \text{(Equation 3)}$$

Equation 3 expresses the displacement of the follower B when the rotary disk A is rotated by the measured angle θ, that is, the displacement of the contact point P, which is indicated by a sine curve passing the origin point of a y-θ coordinate. The state with the measured angle θ of 0° as described above means a state where the center of disk $O_1$, the center of rotation $O_2$, and the axis of the shaft part D match, and means a position with minimum displacement of the contact point P. The displacement y at this time is 0 (zero). It can be considered that the displacement y of the contact point P corresponds to a change in radial deflection of the gas turbine rotor with the misalignment in the present invention.

The radial deflection amount of the gas turbine rotor is measured in such a manner that displacement (a distance between the displacement gage 2 and the outer surface of the at other measurement points are measured as changes of readings of the displacement gage with reference to the measurement starting point $X_1$. Meanwhile, in Equation 3, when the measured angle θ is 0°, the displacement y is 0 (zero). Generally, for measurement of circularity of the gas turbine rotor having misalignment, a position with the measured angle θ of 0 (zero) (position with the minimum displacement) is unclear at the start of measurement. Thus, actual measurement is started when the measured angle θ is $\theta_a$ and the displacement y is $y_a$, and this point is regarded as the measurement starting point $X_1$. Coordinate transformation of Equation 3 is performed so that the measured angle at this time is 0° and the displacement Y is 0 (zero).

An expression of deflection after the coordinate transformation is expressed by Equation 4 on an X-Y coordinate.

$$Y = e[1 - \cos(X + \theta_a)] - y_a \qquad \text{(Equation 4)}$$

This equation is an expression of deflection that forms the basis for a misalignment calculation method according to the present invention. The measured angle X means a measured angle (rotation angle) from the measurement starting point. The displacement Y means a displacement amount at the measured angle X. The angle $\theta_a$ is referred to as an initial angle, and the displacement $y_a$ is referred to as initial displacement. The eccentric distance e between the center of rotation $O_2$ and the center of FIG. $O_1$ of the eccentric disk cam shown in FIG. 3 corresponds to the amplitude of the sine curve in Equation 4 (½ of the entire deflection width).

The measured values at the three measurement points are assigned to variables X and Y in Equation 4 to define constants e, $\theta_a$ and $y_a$, and determine an expression of one calculated circle.

Figure 2:
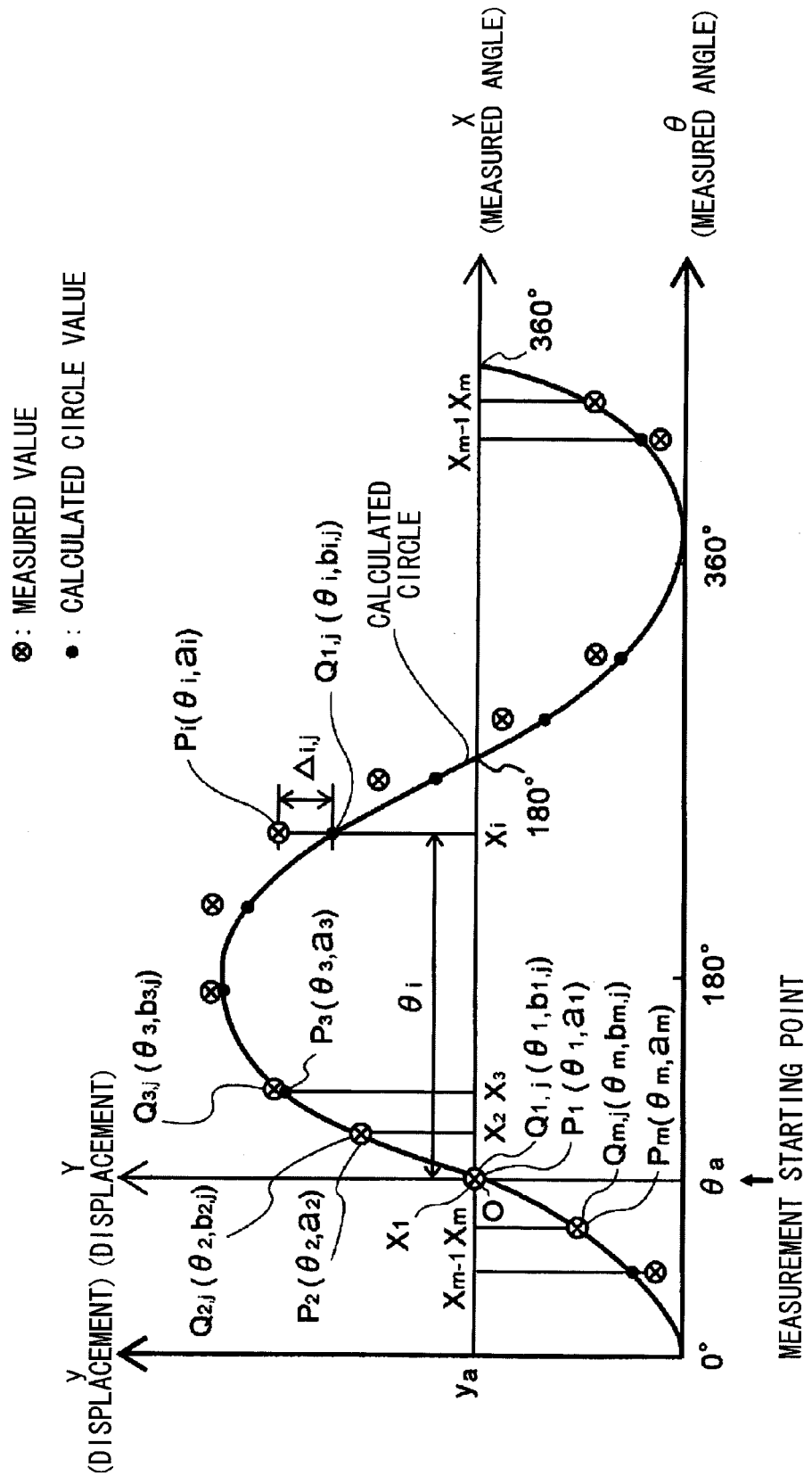
FIG. 2 is a diagram showing a relationship among a measured value, a reference circle, and a calculated circle on an X-Y coordinate.

FIG. 2 shows a relationship among the measured value of the rotor, the reference circle, and the calculated circle shown in FIG. 1, developed on a plane coordinate. In FIG. 2, the abscissa X represents the measured angle from the measurement starting point, and the ordinate Y represents displacement at the measurement point. The expression of deflection expressed by Equation 4 is indicated by a sine curve passing the origin point O on the X-Y coordinate shown in FIG. 2.

In FIG. 2, the calculated circle is shown by a solid line. The reference circle is a perfect circle, and it is considered that the displacements at all the measured angles are 0 (zero), and thus the reference circle matches the X axis. The origin point O is the measurement starting point $X_1$. The measurement points in the circumferential direction of the rotor are indicated as the measurement points $X_i$ corresponding to the measured angles $\theta_i$ by dividing the X-axis into (m) parts between 0° to 360° on the X-Y coordinate. The measured value $P_i$ at each measurement point $X_i$ (i=1 to m) is an actual measured value. A relationship between the y-θ coordinate and the X-Y coordinate that are original coordinates is a relationship with a deviation by the measured angle of $\theta_a$ on the X-axis and the displacement of $y_a$ on the Y-axis. The amplitude of the sine curve (½ of the entire deflection width) corresponds to the misalignment amount. The initial angle $\theta_a$ corresponds to the misalignment angle.

As described above, the calculated circle determined by the three arbitrary measurement points in FIG. 1 being developed on the X-Y coordinate corresponds to the locus of the calculated circle shown by the solid line in FIG. 2. In FIG. 1, the calculated circle determined by the three measured values $P_1$, $P_2$ and $P_m$ at the measurement points $X_1$, $X_2$ and $X_m$ is shown by way of example. The calculated circle shown in FIG. 2 is the calculated circle in FIG. 1 being developed as a sine curve on the X-Y coordinate. FIGS. 1 and 2 show only one calculated circle (j-th calculated circle), but there are actually (n) calculated circles determined by Equation 4.

Further, the error amount $\Delta_{i,j}$ expressed by Equation 1 is indicated as a difference between the measured value $P_i$ and the calculated circle value $Q_{i,j}$ on the calculated circle in FIG. 2. Specifically, the measured value of the deflection amount is indicated by $P_i$ ($\theta_i$, $a_i$) at the measurement point $X_i$ (measured angle $\theta_i$) on the X-axis. The calculated circle value on the calculated circle is indicated by $Q_{i,j}$ ($\theta_i$, $b_{i,j}$). Thus, the error amount $\Delta_i$, can be indicated as a difference between the measured value $P_i$ ($\theta_i$, $a_i$) and the calculated circle value $Q_{i,j}$ ($\theta_i$, $b_{i,j}$). As described above, the error amount $\Delta_{i,j}$ is a square of the difference between the measured value $P_i$ and the calculated circle value $Q_{i,j}$ as expressed in Equation 1 in view of different plus and minus signs of the differences between the measured values and the calculated circle values and easy selection of the abnormal value.

Then, the error amount $\Delta_{i,j}$ is calculated to determine a total error amount value $\Delta S_j$ (j=1 to n). After the total error amount value $\Delta S_j$ (j=1 to n) is calculated for each calculated circle, a minimum total error amount value $\Delta S_j$ (j=a) is selected, and thus the calculated circle having the minimum total error amount value $\Delta S_a$ (j=a) is the most probable circle.

A difference between the center of the most probable circle finally selected and the center of rotation (corresponding to the center of the reference circle) is misalignment. Specifically, the misalignment data is expressed by the misalignment amount and the misalignment angle. In FIG. 2, the misalignment amount is calculated as the amplitude of the sine curve of the most probable circle, and the misalignment angle is calculated as an initial angle $\theta_a$. The misalignment amount and the misalignment angle thus determined are the misalignment data of the most probable circle calculated according to the present invention.

If the number of measurement points (m) in the circumferential direction of the rotor is increased, calculation accuracy of the misalignment data of the most probable circle is improved but an amount of calculation is increased. Meanwhile, if the number of measurement points is reduced, calculation accuracy of the misalignment data of the most probable circle is reduced. However, from the idea of the present invention, the number of measurement points needs to be at least four or more. With the number of measurement points of three or less, the basic idea of the present invention does not hold.

Figure 5:
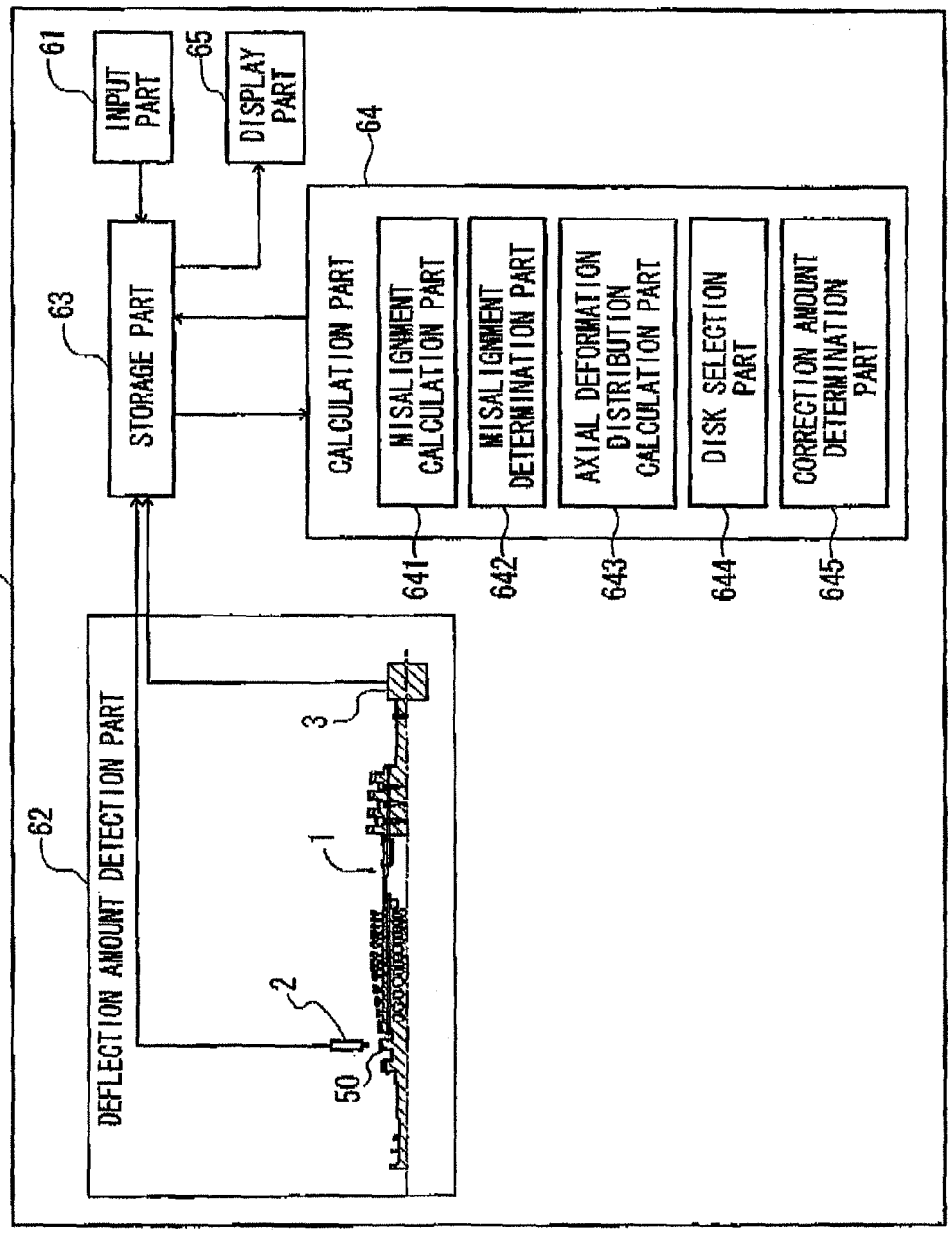
FIG. 5 is a diagram showing a configuration of a system for calculating axial deformation of a turbine rotor according to the present invention.

Next, a configuration of a system for calculating axial deformation of the gas turbine rotor based on the misalignment calculation method of the rotor disk will be described with reference to FIG. 5.

This system 60 includes an input part 61, a deflection amount detection part 62, a storage part 63, a calculation part 64, and a display part 65.

The input part 61 inputs initial values such as the number of rotor disks (DM) or the number of measurement points (m) in the circumferential direction of each rotor disk. The number of measurement points (m) may be different for each rotor disk.

The deflection amount detection part 62 selects at least four or more measurement points in the circumferential direction along the outer surfaces of all the rotor disks from the input number of measurement points (m) in the circumferential direction of the rotor disk, and the displacement gage 2 is placed close to the outer surface of the rotor disk. The rotation angle of the rotor disk is measured by a rotation indicator 3 provided separately or included in the gas turbine. While the gas turbine rotor 1 is rotated, a measured value at each measurement point of the rotor disk 50 is read and stored in the storage part 63. The target measured values include a deflection amount (radial displacement amount) and a measured angle (rotation angle from the measurement starting point). As the displacement gage, various known sensors are applied. For example, a contact sensor such as a dial gage, or a non-contact sensor such as a laser sensor, a capacitance sensor, or an ultrasonic sensor can be used.

The measurement point of the rotor disk 50 is selected by previously marking off measurement positions of all the measurement points $X_i$ (i=1 to m) on the outer surface of the rotor disk. For the measured value at each measurement point, a reading of the displacement gage is automatically captured as the measured value when the rotor disk 50 is rotated at low speed and reaches a measurement position at a predetermined measurement point. For the position of the measurement point, a previously set measurement position is confirmed by a CCD sensor or the like (not shown). In measurement of one rotor disk, the measurement starting point is determined, the rotor is rotated one turn while the position of the measurement point is confirmed, and thus measured values at all the measurement points are collected. It may be conceivable that only the measurement starting point is selected on the outer surface of the rotor disk, and other measurement points are selected by rotation angles from the measurement starting point. The position of the measurement starting point may be input from the input part 61 for each rotor disk.

After the measurement of one rotor disk 50 is finished, the rotor is moved, a position of a measurement starting point of a next adjacent rotor disk is determined, and measurement is performed by the same procedure. When measurement of all the rotor disks is finished, measurement work of the rotor disks is completed. In the measurement, the displacement gage may be moved without moving the rotor.

The calculation part 64 includes a misalignment calculation part 641, a misalignment determination part 642, a calculation part for the distribution of axial deformation 643, a corrected disk selection part 644, and a correction amount determination part 645.

The misalignment calculation part 641 calls up a measured value $P_i$ including the actual measurement values of the measured angle and the deflection amount (radial displacement amount) stored in the storage part 63, and determines a calculated circle from the three measurement points based on Equation 4. From the determined calculated circle, a calculated circle value $Q_{i,j}$ for each measurement point $X_i$ (i=1 to m) is calculated. Then, from the measured value $P_i$ and the calculated circle value $Q_{i,j}$ at each measurement point $X_i$ (i=1 to m), an error amount $\Delta_{i,j}$ is calculated by Equation 1. Further, a total error amount value $\Delta S_j$ is derived from the error amount $\Delta_{i,j}$ by Equation 2. By the same process, other calculated circles are determined from other combinations of three measurement points, and a total error amount value $\Delta S_j$ (j=1 to n) for each calculated circle is calculated. A minimum total error amount value $\Delta S_a$ (j=a) is determined among the total error amount values $\Delta S_j$ (j=1 to n), and the calculated circle for the minimum total error amount value $\Delta S_a$ (j=a) is regarded as a most probable circle. Deviation between the center of the most probable circle and the center of rotation is calculated to determine misalignment data (misalignment amount and misalignment angle). This is the misalignment data of the most probable circle of a target rotor disk. Calculation is repeatedly performed for all the rotor disks, misalignment data of a most probable circle for each rotor disk is calculated and stored in the storage part 63.

The misalignment determination part 642 refers to a misalignment amount from the misalignment data of the most probable circle for all the rotor disks called up from the storage part 63, and a maximum misalignment amount and a rotor disk having the maximum misalignment amount is determined. Then, it is determined whether the maximum misalignment amount is within a reference value (reference value 2) or not. When it is determined that the maximum misalignment amount is within the reference value, the calculated misalignment data of the most probable circle is determined to be proper, and the distribution of axial deformation of the gas turbine rotor is prepared and stored in the storage part 63. For the misalignment data of the most probable circle, one piece of misalignment data of a most probable circle is determined for each rotor disk, but for the maximum misalignment amount, one maximum misalignment amount is determined for the entire assembly of the turbine rotor.

When the maximum misalignment amount exceeds the reference value (reference value 2), it is determined that correction of axial deformation of the turbine rotor is required. The outline of the basic idea of correcting the axial deformation of the turbine rotor has been described in FIG. 7. Specifically, it is sufficient that a rotor disk to be corrected is selected to determine a disk correction amount. A specific method will be described later.

The calculation part for the distribution of axial deformation 643 plots a misalignment amount and a misalignment angle for each rotor disk based on the misalignment data of the most probable circle determined to be proper to prepare the distribution of axial deformation of the gas turbine rotor. One example of the distribution of axial deformation is shown in FIG. 9.

The display part 65 displays the measured values (measured angle and radial displacement amount) of the deflection amount of each rotor disk called up from the storage part 63, the misalignment data of the most probable circle (misalignment amount and misalignment angle), and the distribution of axial deformation of the gas turbine rotor. Further, when the maximum misalignment amount includes an abnormal value, the measurement point concerned and a measured value and an error amount at the measurement point are displayed.

The axial deformation is corrected by the corrected disk selection part 644 and the correction amount determination part 645. The corrected disk selection part 644 and the correction amount determination part 645 will be described below.

As described above, the corrected disk selection part 644 corrects only one rotor disk, and selects the rotor disk 50 having the maximum misalignment amount as a disk to be corrected. This is because a maximum misalignment amount after the correction of the disk can be minimized as compared with the case where the other rotor disks are selected as a disk to be corrected.

The correction amount determination part 645 will be described with reference to FIG. 7. FIG. 7 shows an axial deformation state with a maximum misalignment amount Z in the rotor disk 50 of the gas turbine rotor 1 as described above. In FIG. 7, a figure FGHI shows a sectional shape in a longitudinal direction of the rotor when the rotor disk is cut along a plane including the rotor axial center. A sectional shape of the adjacent rotor disk 51 is shown by a figure FGLM. Contact surfaces FG of the rotor disks 50 and 51 are joint surfaces 50$b$ and 51$b$ of the rotor disk. In the gas turbine rotor 1, a plurality of rotor disks are placed one next to another via the joint surfaces, and opposite ends are supported by the bearings S1 and S2 to configure an integral gas turbine rotor 1.

FIG. 7 shows the axial deformation state of the rotor in an exaggerated manner. Actually, a horizontal distance between the bearing S1 and the rotor disk 50 is sufficiently long as compared with the misalignment amount Z of the rotor. Thus, the outer surface 50$a$ of the rotor disk is substantially parallel to the rotor rotation center line RC. The figure FGHI showing the sectional shape in the rotor longitudinal direction of the rotor disk 50 is shown in a trapezoidal shape, but is actually of a substantially rectangular shape. This example shows a case where the axial center $O_1$ of the rotor disk 50 is displaced from the center of rotation $O_2$ of the rotor by the maximum misalignment amount Z, and the rotor disk 50 (section FGHI) is joined to the adjacent rotor disk 51 (section FGLM) via the joint surfaces 50$b$ and 51$b$ (contact surfaces FG).

The axial deformation is corrected by selecting the disk to be corrected and correcting thickness distribution of the rotor disk. Specifically, in FIG. 7, parallelism between the joint surfaces 50$b$ and 50$c$, and 51$b$ and 51$c$ of the rotor disk 50 to be corrected and the adjacent rotor disk 51 is corrected to reduce the contact surface angle ($\alpha$) between the joint surfaces 50$b$ and 51$b$ to correct axial deformation. When the parallelism between the joint surfaces 50$b$, 50$c$, 51$b$ and 51$c$ is ensured, the contact surface angle ($\alpha$) is substantially 0 (zero). Specifically, it is sufficient that the axial deformation of the gas turbine rotor is corrected by cutting a part of the joint surfaces 50$b$ and 51$b$ of the rotor disks 50 and 51 so that the position of the axial center $O_1$ at the rotor disks 50 and 51 is moved to the position of the center of rotation $O_2$ of the rotor.

In FIG. 7, a cutting method will be specifically described taking the rotor disk 50 (sectional shape FGHI) to be corrected as an example. A perpendicular is dropped from a point G to a side FI in the figure FGHI, an intersection thereof is R, and a length of a side FR is L1. If a hatched section FGR is cut in the sectional shape FGHI, parallelism between the joint surfaces 50$b$ and 50$c$ of the rotor disk 50 is maintained. Similarly, for the adjacent rotor disk 51 (sectional shape FGLM), a perpendicular is dropped from the point G to a side FM, an intersection thereof is T, and a length of a side FT is L2. If a hatched section FGT is cut, parallelism between the joint surfaces 51$b$ and 51$c$ of the adjacent rotor disk 51 can be also ensured. As such, the hatched portions (sections FGR and FGT) in the two rotor disks 50 and 51 are cut with the joint surfaces 50$b$ and 51$b$ of the adjacent rotor disks 50 and 51 therebetween to correct parallelism of the rotor disks, thereby allowing the axial deformation of the rotor to be corrected.

A specific calculation method of a cutting amount of the disk to be corrected will be described below. Herein, a distance between the bearing S1 and the joint surface 50$b$ of the rotor disk 50 on the rotor rotation center line RC is LL1, and an angle formed by a rotor axial center CC1 and the rotor rotation center line RC is the inclination angle of a rotor axial center ($\alpha$1). Similarly, a distance between the bearing S2 and the joint surface 51$b$ on the rotor rotation center line RC is LL2, and an angle formed by a rotor axial center CC2 of the adjacent rotor disk 51 and the rotor rotation center line RC is the inclination angle of a rotor axial center ($\alpha$2). A diameter of the rotor disks 50 and 51 is DD.

In the sectional shape FGHI, a triangle FGR of the rotor disk 50 to be cut is similar to a triangle $O_1O_2S1$ formed by the bearing S1, the rotor axial center CC1, and the rotor rotation center line RC. Thus, the length L1 of a side FR is expressed by Equation 5.

$$L1 = Z \times (DD/LL1) \quad \text{(Equation 5)}$$

Similarly, the length L2 of a side FT of the adjacent rotor disk 51 is expressed by Equation 6.

$$L2 = Z \times (DD/LL2) \quad \text{(Equation 6)}$$

Thus, with reference to the outer surface of the rotor disk 50, the section FGR corresponding to the length L1 from the joint surface 50$b$ toward the bearing S1 is cut in the longitudinal direction of the rotor, and with reference to the outer surface of the adjacent rotor disk 51, the section FGT corresponding to the length L2 from the joint surface 51$b$ toward the bearing S2 is cut, thereby allowing axial deformation of the gas turbine rotor 1 to be eliminated. The section FGR and the section FGT corresponding to the side FR (length L1) and the side FT (length L2) thus determined are correction amounts provided to the rotor disk to be corrected.

The contact surface angle (α) is the sum of the inclination angles of the rotor axial center (α1) and (α2).

In the above-described correction method, the rotor disks 50 and 51 on both sides are cut with the joint surfaces 50b and 51b of the rotor disks 50 and 51 adjacent to each other therebetween, but only the rotor disk 50 having the maximum misalignment amount may be cut. In this case, with reference to the outer surface of the rotor disk 50, a section corresponding to the sum of the length L1 of the side FR and the length L2 of the side FT is cut and corrected from the joint surface 50b toward the bearing S1. Specifically, only one rotor disk 50 may be cut and corrected using the sum of the lengths L1 and L2 with reference to the outer surface corresponding to a cutting amount of the rotor disks 50 and 51 on both sides with the joint surfaces 50b and 51b therebetween. A distance LL1 between the bearing S1 and the rotor disk 50 is sufficiently larger than the diameter DD of the rotor disk, which does not cause a large error.

The above-described simple method may be applied to the adjacent rotor disk 51 instead of the rotor disk 50, but is desirably applied to the rotor disk 50 having the maximum misalignment amount. This is because the maximum misalignment amount after correction becomes minimum.

With the configuration of the system for calculating axial deformation of the gas turbine rotor described above, the axial deformation of the gas turbine rotor can be calculated by a simpler method than conventional methods.

Figure 6A:
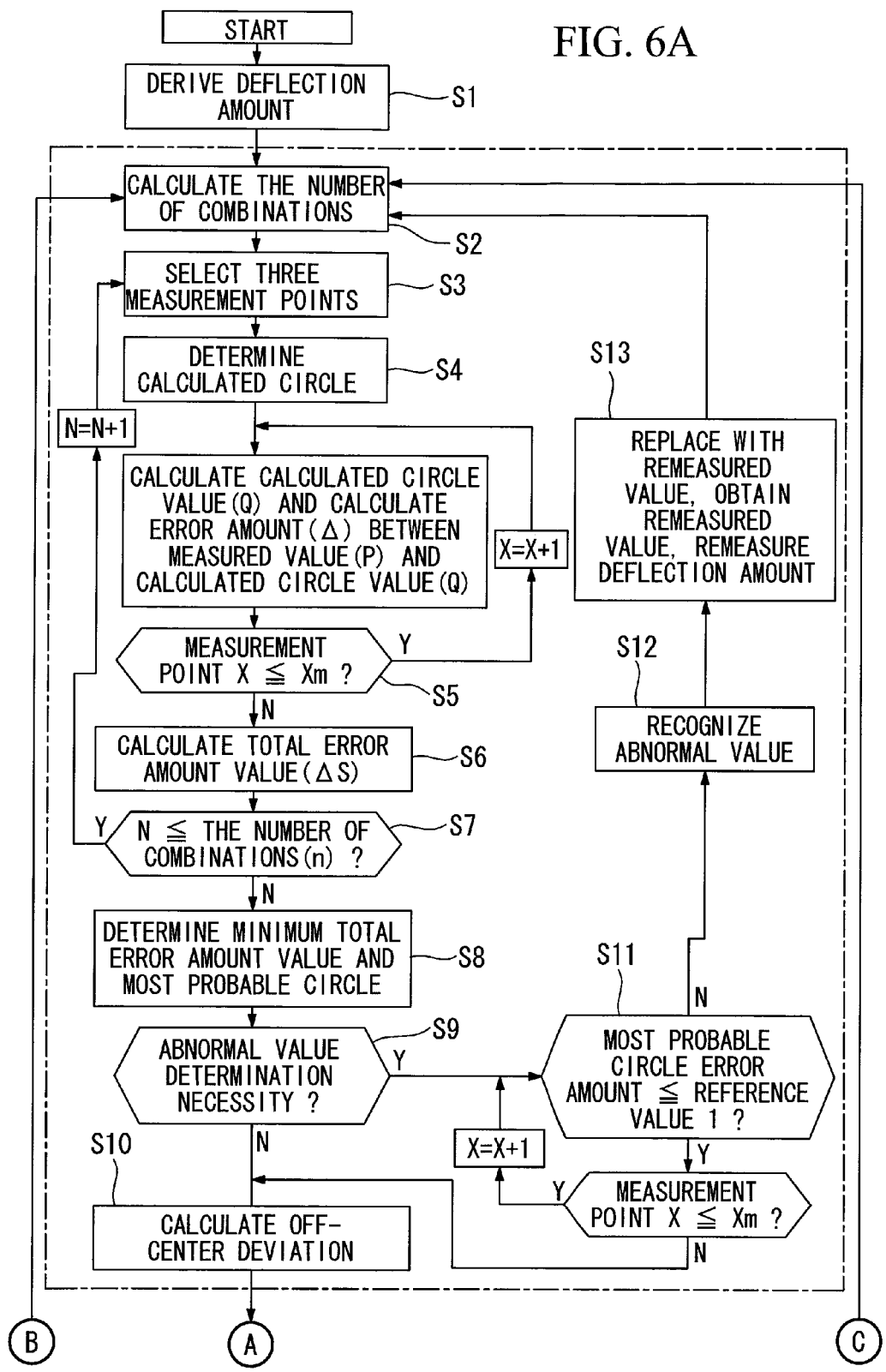
FIG. 6A is a diagram showing a calculation procedure of axial deformation of the turbine rotor according to the present invention.
Figure 6B:
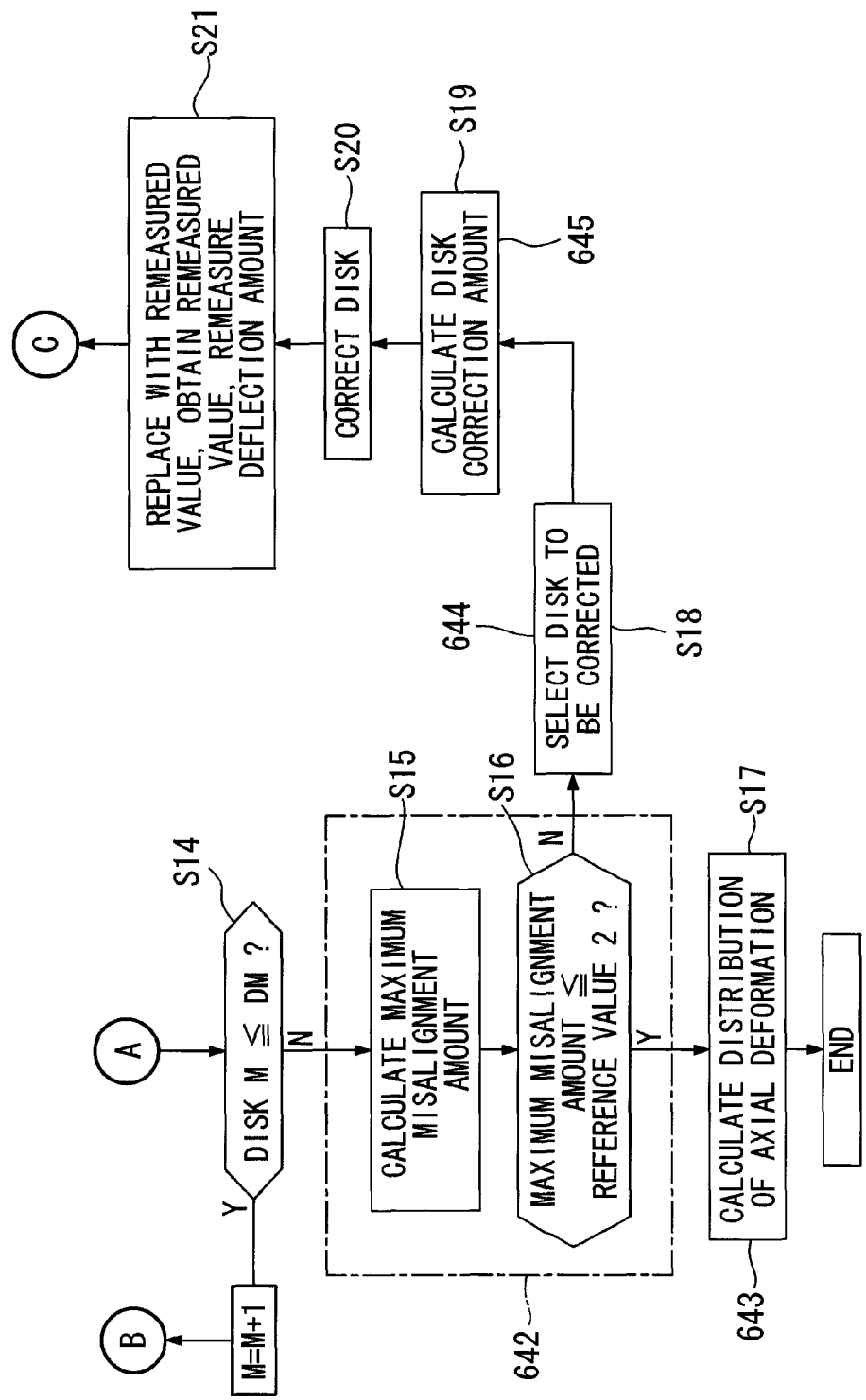
FIG. 6B is a diagram showing the calculation procedure of the axial deformation of the turbine rotor according to the present invention.

Next, a calculation procedure of the axial deformation of the gas turbine rotor according to the present invention will be described with reference to FIGS. 6A and 6B.

First, at the input part 61, the number of rotor disks (DM), specifications of the rotor disk (disk diameter DD, disk thickness, distances LL1 and LL2 from the bearing, or the like), and the number of measurement points (m) in the circumferential direction of the rotor disk are input. Based on these input data, the deflection amount detection part 62 performs measurement to derive a deflection amount (radial displacement amount and measured angle) of each rotor disk (Step S1).

Then, from the input number of measurement points (m) in the circumferential direction of the rotor disk, the number of combinations (n) of three measurement points is determined (Step S2). The number of combinations (n) can be determined by $n = (_mC_3)$.

Then, three arbitrary measurement points are selected (Step S3). One calculated circle is determined from the selected three points.

Measured values of the selected three points are assigned to Equation 4 to determine the calculated circle (Step S4).

For the determined calculated circle, calculated circle values $Q_{i,j}$ ($\theta_i$, $b_{i,j}$) for all the measurement points $X_i$ (i=1 to m) are calculated. From each measured value $P_i$ ($\theta_i$, a) and each calculated circle value $Q_{i,j}$ ($\theta_i$, $b_{i,j}$), Equation 1 calculates an error amount $\Delta_{i,j}$ for each measurement point $X_i$ (i=1 to m) (Step S5).

After error amounts $\Delta_{i,j}$ for all the measurement points $X_i$ (i=1 to m) are calculated, a total error amount value $\Delta S_j$ is calculated for a target calculated circle by an expression (Step S6). When this step finishes, calculation of one total error amount value $\Delta S_j$ for one calculated circle is finished.

For all the number of combinations (n) of three measurement points among the number of measurement points (m), the calculation from Steps S3 to S6 is repeated (Step S7). The calculation is repeated for all the number of combinations (n), and thus one total error amount value $\Delta S_j$ can be calculated for each calculated circle among (n) calculated circles.

Then, a minimum total error amount value $\Delta S_a$ is selected from (n) total error amount values $\Delta S_j$ (j=1 to n) to determine a most probable circle (Step S8). When the most probable circle is determined, a calculated circle value corresponding to each measured value for the most probable circle, that is, a most probable circle calculated circle value can be calculated. From the most probable circle calculated circle value and each measured value $P_i$, an error amount between the most probable circle and the measured value, that is, a most probable circle error amount $\Delta_{i,a}$ (i=1 to m, j=a) is determined.

Then, it is determined whether abnormal value determination for each measured value $P_i$ is necessary or not (Step S9).

This procedure is taken for the following reason. Even if the measured value includes an abnormal value, the proper most probable circle is selected and determined. Specifically, a miniscule number of abnormal values generally appear at the number of all measurement points (m) of the measurement point $X_i$ (i=1 to m). Thus, even if the measured value $P_i$ includes an abnormal value, there is always a combination of three points with the measured value $P_i$ that does not include an abnormal value in the process of calculating the calculated circle by the combination of three arbitrary points. Specifically, there is always a calculated circle that does not include an abnormal value, and thus even if the measured value $P_i$ includes an abnormal value, the most probable circle finally determined is a proper most probable circle that does not include an abnormal measured value $P_i$. Therefore, even if the most probable circle is determined with the measured value $P_i$ including an abnormal value, no problem occurs in determination of the most probable circle. As a result, for simply advancing misalignment calculation work, calculation of misalignment without determination of an abnormal value of each measured value can obtain proper misalignment data of a most probable circle, and the misalignment calculation work can be finished directly.

When abnormal value determination is unnecessary in the process to determine whether abnormal value determination is necessary or not, the misalignment data of the most probable circle (misalignment) is calculated (Step S10) to finish the misalignment calculation work. The misalignment data of the most probable circle is deviation between the center of the most probable circle and the center of rotation $O_2$, and includes a misalignment amount (eccentric distance e) and a misalignment angle. Specifically, the misalignment amount corresponds to the amplitude of a sine curve of the most probable circle, and the misalignment angle corresponds to an initial angle $\theta_a$. A case where, without determining whether the abnormal value determination is necessary or not, the most probable circle is determined, and the misalignment data of the most probable circle is calculated to finish the work is regarded as substantially the same invention as the present invention. The procedure from calculation of the number of combinations (n) (Step S2) to calculation of the misalignment (Step S10) is performed by the misalignment calculation part 641.

When it is determined that abnormal value determination is necessary, the presence of the abnormal value is checked and the abnormal value is recognized in Steps S11 and S12 below.

Specifically, for the determined most probable circle, an error amount corresponding to the most probable circle is selected among the error amounts $\Delta_{i,j}$ at the measurement points $X_i$ (i=1 to m) calculated in Step 7 as most probable circle error amounts $\Delta_{i,a}$ (i=1 to j=a), and it is determined whether each of the most probable circle error amounts $\Delta_{i,a}$ (i=1 to m, j=a) is within a reference value (reference value 1) or not for all the measurement points $X_i$ (i=1 to m) (Step S11).

When the most probable circle error amount $\Delta_{i,a}$ (for example, i=f, j=a) exceeds the reference value, the measured value $P_f(\theta_f, a_f)$ for the measurement point $X_f$ is recognized as an abnormal value (Step S12).

When all the most probable circle error amounts $\Delta_{i,a}$ (i=1 to m, j=a) are within the reference value, it is determined that normal measurement has been performed before the misalignment data of the most probable circle is calculated, and the misalignment calculation work is finished (Step S10). The misalignment data of the most probable circle is a deviation length between the center of the most probable circle and the center of rotation, and includes a misalignment amount (eccentric distance e) and a misalignment angle. Specifically, the misalignment amount corresponds to the amplitude of the sine curve of the most probable circle, and the misalignment angle corresponds to the initial angle $\theta_a$.

When the measured value $P_f$ is recognized as an abnormal value, the deflection amount detection part 62 remeasures the deflection amounts (radial displacement amount and measured angle) for all the measurement points $X_i$ (i=1 to m), and a remeasured value is obtained from the storage part 63 to replace the measured value $P_i$ (i=1 to m) with the remeasured value (Step S13).

When replacement of each measured value at the measurement points $X_i$ (i=1 to m) is finished, the process returns to Step S2, and recalculation is performed. The calculation procedure in Steps S2 to S9 in FIG. 5 is repeated until the most probable circle error amounts $\Delta_{i,a}$ (i=1 to m, j=a) fall within the reference value, and when the most probable circle error amounts $\Delta_{i,a}$ fall within the reference value, the misalignment calculation part 641 finishes the procedure.

When a simpler axial deformation calculation method is selected, it may be conceivable that the procedure in Steps S11, S12 and S13 is omitted, the misalignment amount and the misalignment angle are calculated irrespective of the presence of the abnormal value (Step S10), and misalignment calculation work of the next rotor disk is performed (Step S14). Such a case has the same basic idea as the present invention and falls within the scope of the present invention.

Subsequently, calculation is repeated to obtain misalignment data of a most probable circle for each of the other rotor disks (Step S14).

With reference to the misalignment data of the most probable circle for all the rotor disks, a misalignment amount having a maximum value is selected as a maximum misalignment amount (Step S15).

The misalignment determination part 642 further determines whether the maximum misalignment amount is within a reference value (reference value 2) or not (Step S16). When the maximum misalignment amount is within the reference value, it is determined that axial deformation of the rotor is within a proper range, and the distribution of axial deformation is calculated (Step S17) to finish axial deformation calculation work.

When the maximum misalignment amount exceeds the reference value, the axial deformation needs to be corrected. A correction method of the axial deformation is determined by the corrected disk selection part 644 and the correction amount determination part 645.

The corrected disk selection part 644 selects a rotor disk having a maximum misalignment amount among the rotor disks as a disk to be corrected (Step S18). The rotor disk having the maximum misalignment amount is the disk to be corrected because axial deformation of the turbine rotor after correction is minimum.

The correction amount determination part 645 determines a disk correction amount provided to the rotor disk to be corrected from the calculated misalignment amount and misalignment angle of the rotor disk. Specifically, the maximum misalignment amount Z calculated in Step S15 is selected as a misalignment correction amount, and a cutting amount of the sectional shape (sections FGR and FGT in FIG. 7) corresponding to the lengths L1 and L2 calculated by Equations 5 and 6 is a disk correction amount to be obtained. In FIG. 7, it is sufficient that the cutting is carried out from the joint surface by a cutting amount corresponding to the correction amount with reference to the outer surface of the rotor disk. Thus, the cutting amount calculated from the maximum misalignment amount is selected as the disk correction amount because the correction method is the simplest and the axial deformation of the rotor after correction is minimum (Step S19).

The disk to be corrected is cut to correct the rotor disk 50 (Step S20). Then, the corrected rotor disk is integrated, and then the deflection amount detection part 62 remeasures the deflection amount of the rotor disk 50. The remeasured value is stored in the storage part 63, and for the deflection amount measured value, the initial measured value is replaced with the remeasured value (Step S21). Then, the process returns to the start, and calculation is restarted from the calculation of the number of combinations of three measurement points (Step S2).

This calculation work is repeated by the misalignment determination part 642 until the maximum misalignment amount falls within the reference value (reference value 2) (Step S16). When the maximum misalignment amount falls within the reference value, the distribution of axial deformation is calculated (Step S17) to finish the axial deformation calculation work.

If the axial deformation calculation system of the present invention is applied, axial deformation of the rotor can be calculated by a simpler method than conventional methods. When the measurement including an abnormal value is performed, the abnormal value can be easily eliminated, and a worker can immediately judge whether remeasurement is necessary or not, thereby increasing reliability of the axial deformation calculation work. Also, in the correction work of the rotor disk, the disk to be corrected can be easily specified and the correction amount can be easily determined, and the axial deformation can be easily performed.

The invention claimed is:

1. A system for calculating axial deformation of a turbine rotor, comprising:
    an input part that sets measurement points of rotor disks that constitute the turbine rotor;
    a deflection amount detection part that derives radial displacement amounts of the turbine rotor for at least four or more measurement points along an outer surface in a circumferential direction of the turbine rotor based on measured values measured by a displacement gage;
    a storage part that stores the radial displacement amounts derived by the deflection amount detection part and measured angles at the measurement points; and
    a calculation part that calculates misalignment data of a most probable circle of the turbine rotor based on the radial displacement amounts and the measured angles which are stored in the storage part; and
    a display part that displays the misalignment data of the most probable circuit which is calculated by the calculation part, wherein the calculation part includes:
    a misalignment calculation part that calls up all the measurement points stored in the storage part, selects three arbitrary points to calculate a circle from the radial displacement amounts and the measured angles, calculates calculated circle values for the measurement points from the calculated circle, calculates differences between the calculated circle values and the radial displacement amounts as error amounts at the measurement points, sums the error amounts to derive a total error amount value, repeats calculation for combinations of three measurement points among all the measurement points to calculate each total error amount value, selects a minimum calculated circle among obtained total error amount values for all combinations as a most probable circle, and calculates deviation between the center of the most probable circle and the center of rotation of the turbine rotor as the misalignment data of the most probable circle;

a misalignment determination part that calculates a maximum misalignment amount with reference to the misalignment data of the most probable circle for all the rotor disks to determine whether the maximum misalignment amount is within a reference value or not; and an axial deformation distribution calculation part that calculates the distribution of axial deformation from the misalignment data of the most probable circle.

2. The system for calculating axial deformation of a turbine rotor according to claim 1, wherein the calculation part further includes:

a corrected disk selection part that selects a rotor disk to be corrected; and a correction amount determination part that determines a correction amount of the rotor disk to be corrected.

3. The system for calculating axial deformation of a turbine rotor according to claim 2, wherein the corrected disk selection part selects a rotor disk having the maximum misalignment amount as a rotor disk to be corrected.

4. The system for calculating axial deformation of a turbine rotor according to claim 2, wherein the correction amount determination part selects a disk correction amount calculated from the maximum misalignment amount as a correction amount.

\* \* \* \* \*